(12) United States Patent
Rojo Lulic

(10) Patent No.: US 7,091,639 B2
(45) Date of Patent: Aug. 15, 2006

(54) EXTERNAL ROTOR MOTOR

(75) Inventor: Francisco Rojo Lulic, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 12 days.

(21) Appl. No.: 10/733,602

(22) Filed: Dec. 11, 2003

(65) Prior Publication Data

US 2004/0227420 A1 Nov. 18, 2004

(30) Foreign Application Priority Data

Jan. 23, 2003 (DE) ............................. 203 01 009 U

(51) Int. Cl.
*H02K 5/16* (2006.01)
*H02K 15/02* (2006.01)

(52) U.S. Cl. .......................................... 310/90; 310/91

(58) Field of Classification Search ............... 310/216, 310/217, 258, 259, 90, 91, 40 MM
See application file for complete search history.

(56) References Cited

U.S. PATENT DOCUMENTS

| 2,522,941 | A | * | 9/1950 | Gillen ........................ 310/90 |
| 4,128,778 | A | | 12/1978 | Merkle et al. ............ 310/67 R |
| 4,377,762 | A | * | 3/1983 | Tatsumi et al. ................ 310/42 |
| 4,585,967 | A | * | 4/1986 | Mayer et al. ................ 310/217 |
| 4,682,065 | A | * | 7/1987 | English et al. ................ 310/90 |
| 5,013,957 | A | | 5/1991 | Wrobel ........................ 310/217 |
| 5,170,086 | A | | 12/1992 | Wrobel et al. ............... 310/217 |
| 5,343,104 | A | | 8/1994 | Takahashi et al. ............ 310/90 |
| 5,363,003 | A | * | 11/1994 | Harada et al. ............ 310/67 R |
| 5,436,519 | A | | 7/1995 | Takahashi et al. ........... 310/217 |
| 5,831,359 | A | | 11/1998 | Jeske ........................ 310/68 B |
| 6,265,802 | B1 | * | 7/2001 | Getschmann ............... 310/216 |
| 6,507,135 | B1 | | 1/2003 | Winkler ....................... 310/91 |

FOREIGN PATENT DOCUMENTS

DE 92 05 930.9 12/1992

OTHER PUBLICATIONS

Ebm-Papst Automotive and Drives (UK) Ltd., "Welcome," sales literature describing Series 250, Series 400F and Series 400 (3 pages), downloaded Nov. 21, 2003 from WWW.PAPSTPLC.COM.

* cited by examiner

*Primary Examiner*—Tran Nguyen
(74) *Attorney, Agent, or Firm*—Milton Oliver, Esq.; Ware Fressola Van der Sluys & Adolphson LLP

(57) ABSTRACT

An external rotor motor, suitable for driving a cooling fan, has a structure which facilitates automated assembly with proper angular registration. The rotor has a central shaft which is rotatably supported inside a bearing support tube having a tapered outer surface formed with a circumferential stop and longitudinal guide grooves. An inner stator structure is located radially between the bearing support tube and the rotor. The stator has an internal recess containing a securing ring or disk with inwardly extending tabs. During assembly of the inner stator onto the bearing support tube, the tabs slide in the guide grooves, then bend to form barbs which engage into the outer surface of the bearing support tube, thereby securing the stator on the bearing support tube in a predefined angular orientation. The circumferential stop assures insertion of the bearing support tube to the correct depth.

8 Claims, 7 Drawing Sheets

EXTERNAL ROTOR MOTOR

FIELD OF THE INVENTION

The present invention relates generally to an external rotor motor, and more particularly to very small motors typically used in cooling fans installed inside the housings of personal computers.

BACKGROUND

The assignee of the present invention, ebm-papst St. Georgen GmbH & Co. KG (hereinafter simply "PAPST") manufactures small motors which serve, for example, for cooling of the processors in computers, for device cooling of other small devices, etc. These motors have small dimensions. For example:
fans of the PAPST Series 250 have dimension 8×25×25 mm;
fans of the PAPST Series 400F have dimensions 10×40×40 mm;
fans of the PAPST Series 400 have dimensions 20×40×40 mm;
fans of the PAPST Series 600 have dimensions 25.4×60×60 mm. The power consumption of such fans falls in the range from 0.4 to 0.6 watts for the Series 250, 0.7 to 0.9 watts for the Series 400F, and 0.9 to 1.6 watts for the Series 400 and 600.

External rotor motors in the form of small or miniature motors are often used to drive fans, e.g. those in computers for cooling of the processors. The components of such motors are so small that they look like toys or parts of watches. This is necessary, in order that such motors can, despite their smallness, be assembled simply, with high precision, and economically, preferably by means of an automated assembly process.

SUMMARY OF THE INVENTION

It is therefore an object of the invention to provide a new external rotor motor, wherein the inner stator is supported on a bearing support tube for the shaft of the external rotor, and there is an annular securing ring or disk which secures the bearing support tube and inner stator together. The invention is particularly adapted for use in motors whose rotors are less than about 60 mm in diameter.

The fact that one or more portions of the annular securing disk extend radially into the internal recess of the inner stator, bend themselves during the assembly process, and engage as barbs into the outer surface of the bearing support tube, assures that, when the inner stator and bearing support tube are assembled, they engage securely. The securing disk portions serve as barbs or claws. In case an impact load is placed on the junction of these elements, the barbs dig themselves deeper into the material of the bearing support tube, generally a plastic or an aluminum alloy, so that a secure fastening is created, which as a practical matter can no longer be disassembled. By this means, assembly is simplified, can be done quickly and automatically, and results in a product with the necessary high precision.

The form of the securing disk can vary. It can have one or multiple claws of varying forms, the optimal form being dependent upon the nature of the intended application.

BRIEF FIGURE DESCRIPTION

Further details and advantageous refinements of the invention will be apparent from the following description and drawings of preferred embodiments, which are-intended as exemplary only, not as any-limitation of the invention.

DETAILED DESCRIPTION

Figure 1:
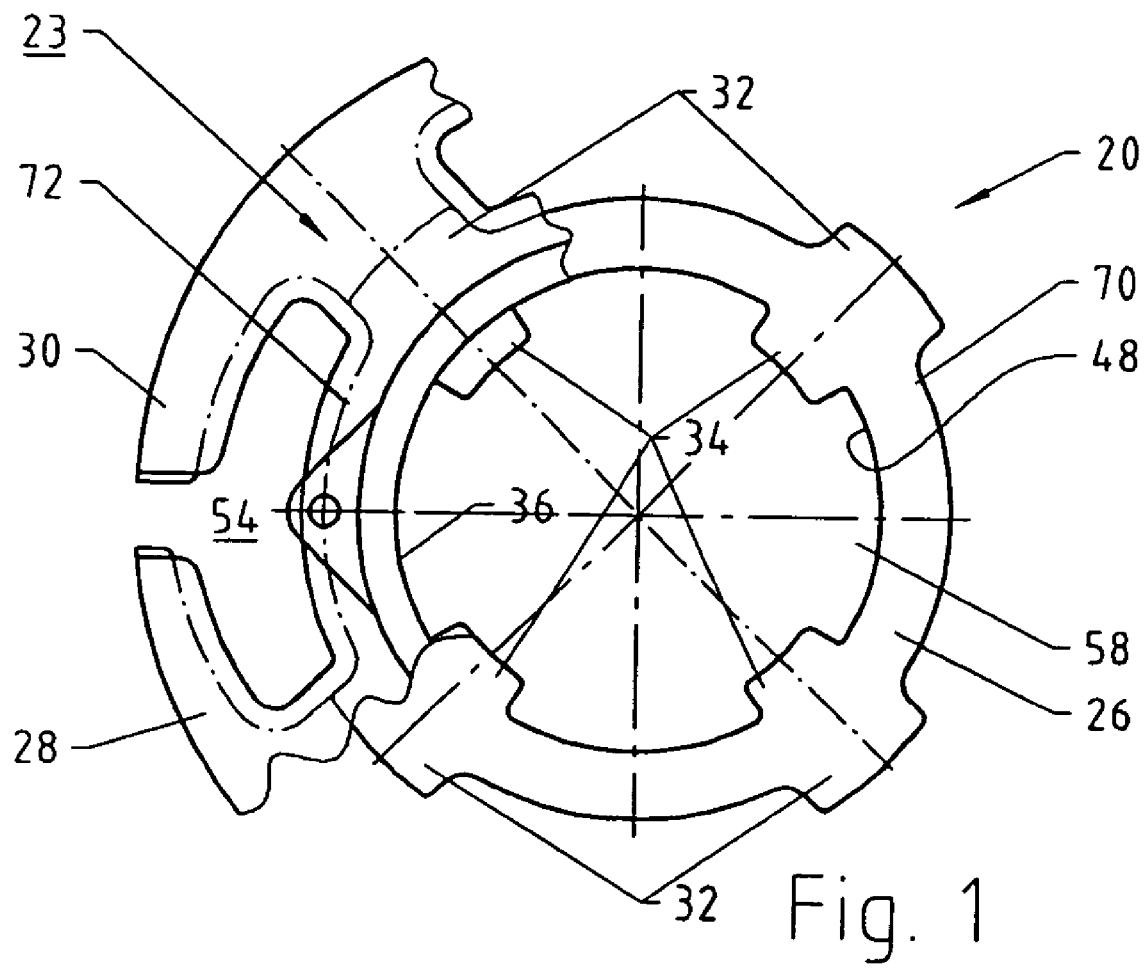
FIG. 1 is a plan view of a preferred form of an annular securing disk, as can be used in the present invention.

FIG. 1 illustrates a securing ring or disk 20, as used in the present invention for an internal stator 22 (FIGS. 2 & 3) with a lamination stack 23 having four radially extending poles 24, 26, 28, 30. To match these four stator poles, the securing ring has four radially outwardly extending projections 32 and four radially inwardly extending tabs 34. Two poles 28, 30 of lamination stack 23 are shown in FIG. 1. Securing ring 20 preferably comprises ferromagnetic material.

Figure 4:
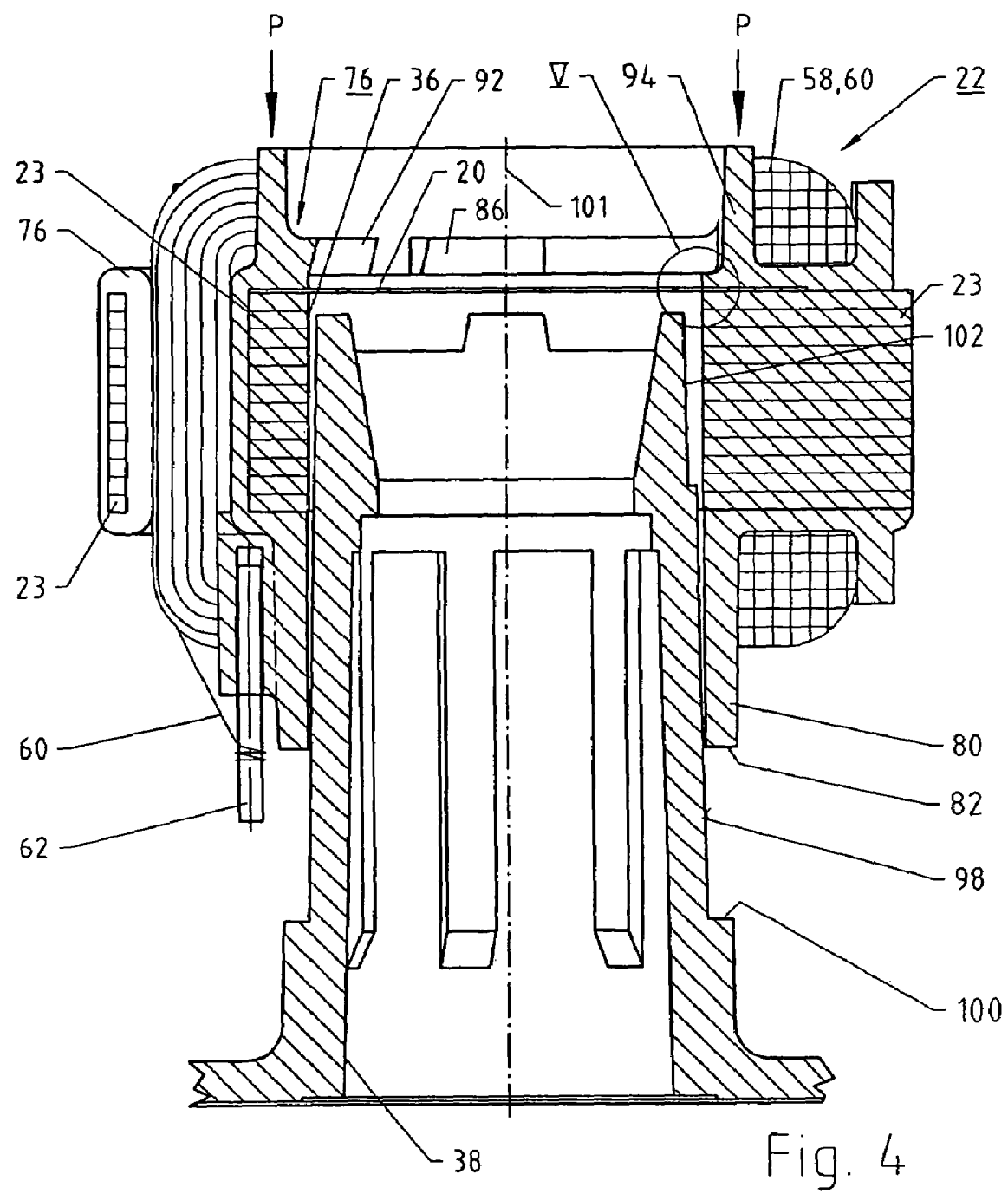
FIG. 4 shows the inner stator of FIGS. 2 & 3, but in a section longitudinally along line IV—IV of FIG. 3, and at the beginning of the mounting of the inner stator onto a bearing support tube.
Figure 6:
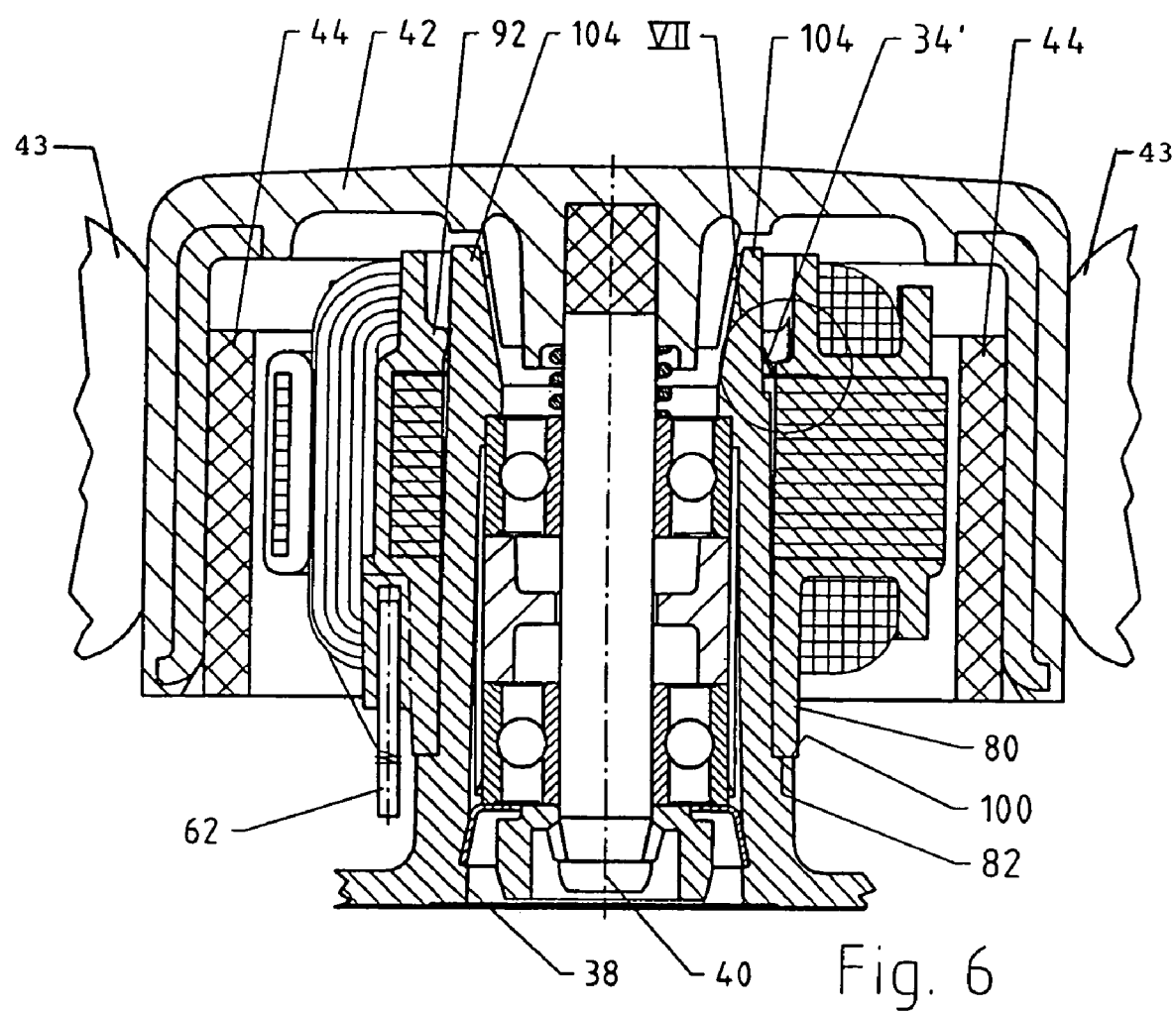
FIG. 6 is a view like that of FIG. 4, in which the inner stator, in which the inner stator is in its final position mounted on the bearing support tube, and also showing the external rotor.

Lamination stack 23 is formed with an internal recess 36 which can be assembled onto a bearing support tube 38, as may be seen by comparing FIG. 4 (partial insertion) with FIG. 6 (full insertion). As shown in FIG. 6, inside the bearing support tube 38, there is supported, on bearings, the central shaft 40 of an external rotor 42 which has permanent magnets 44, which interact in the conventional manner with poles 24 through 30 of inner stator 22. This journalling keeps rotor 42 properly aligned with respect to stator 22.

Usually, these motors are electronically commutated, e.g. with the help of a rotary position sensor or a sensor coil. The mode of operation of such motors, which have been made in quantities of millions of units, is familiar to those skilled in the art, and therefore need not be described here. On the outer surface of rotor 42, fan blades or vanes 43 are preferably provided, and may be integrally formed with the external rotor; see FIG. 6.

Figure 2:
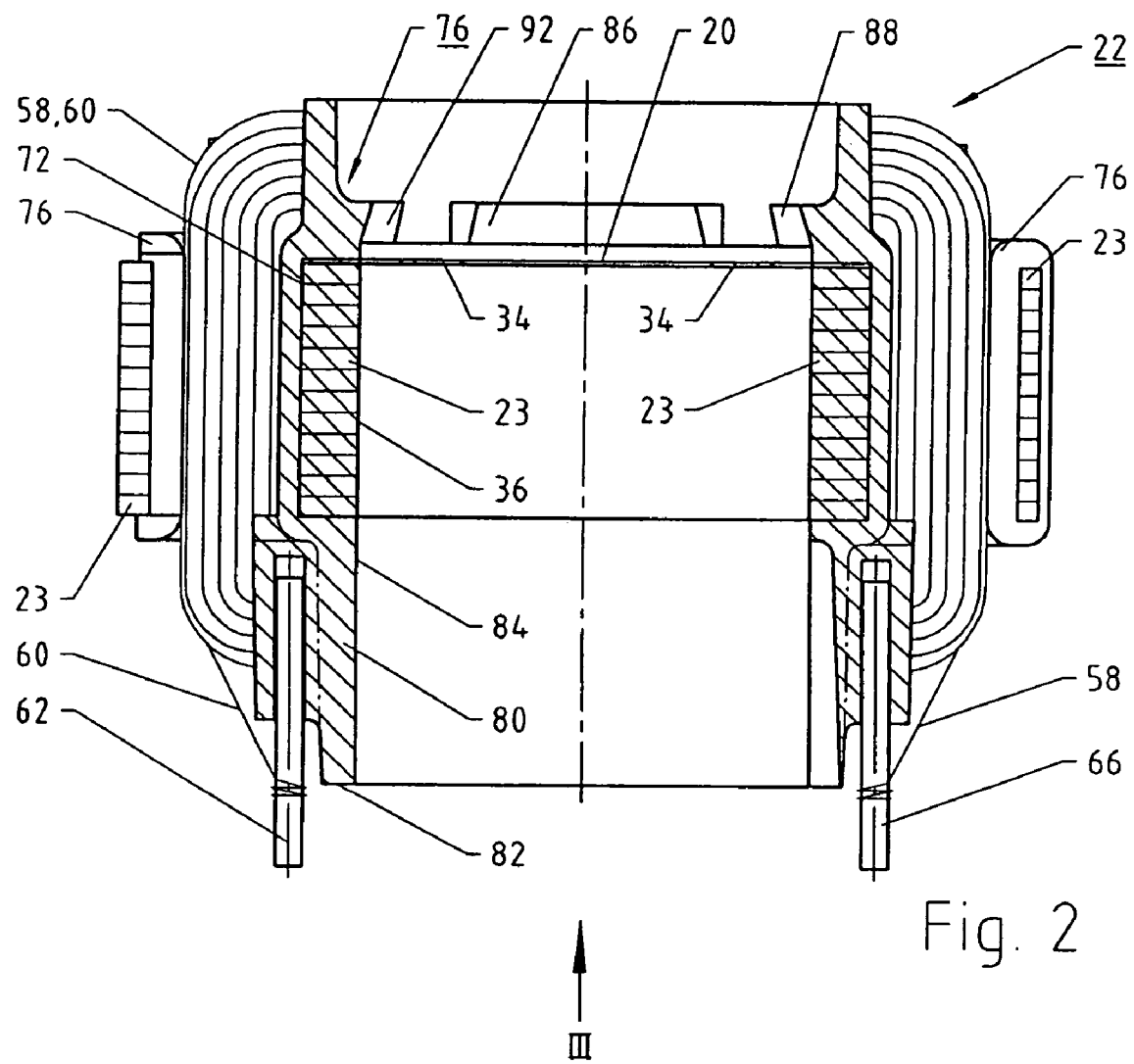
FIG. 2 is a longitudinal section through the stator of an external rotor motor, having an annular securing disk according to FIG. 1, looking along line II—II of FIG. 3.
Figure 3:
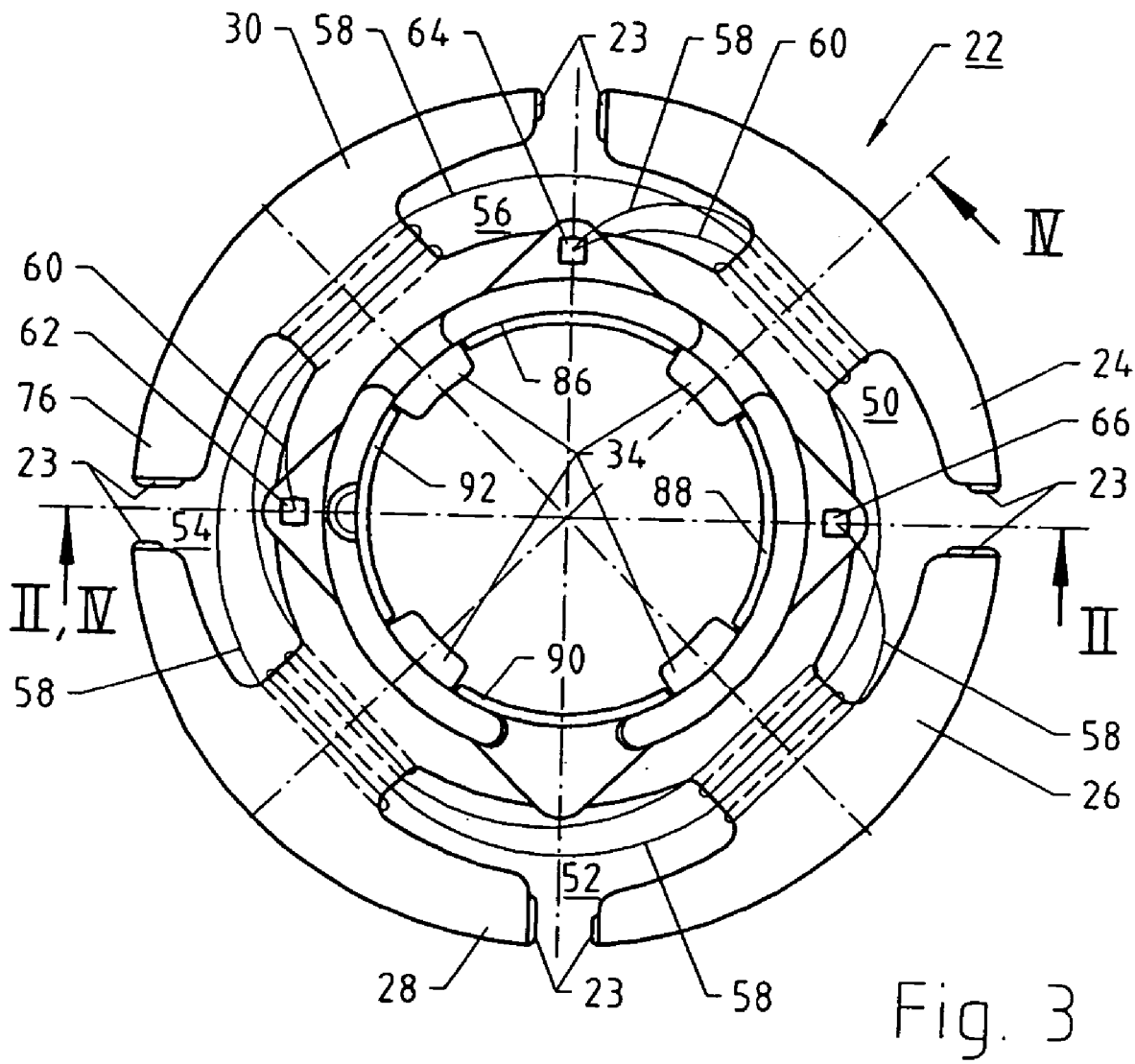
FIG. 3 is a plan view of the stator of FIG. 2, looking in the direction of arrow III of FIG. 2.
Figure 5:
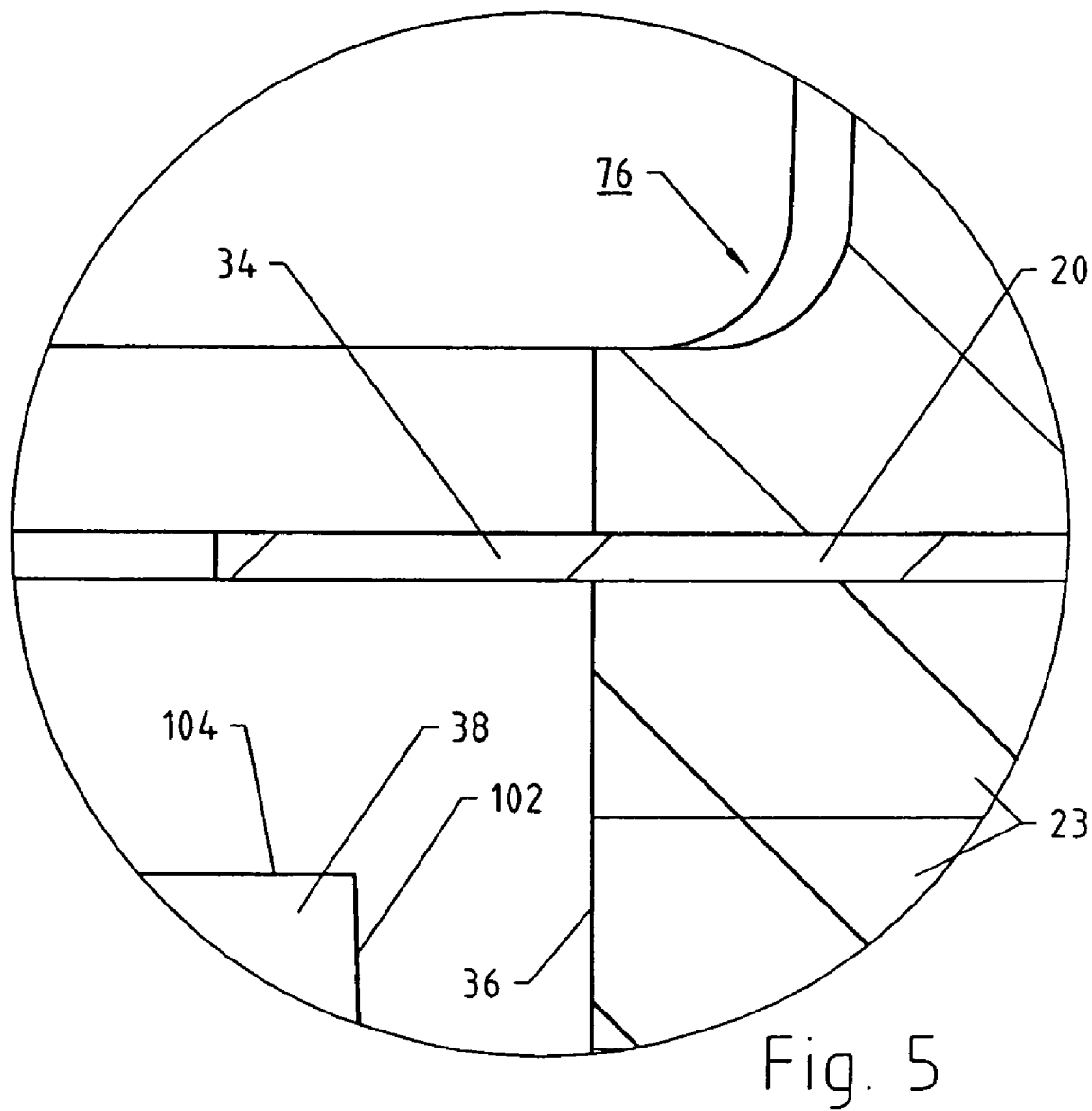
FIG. 5 is an enlarged view of detail V of FIG. 4.
Figure 7:
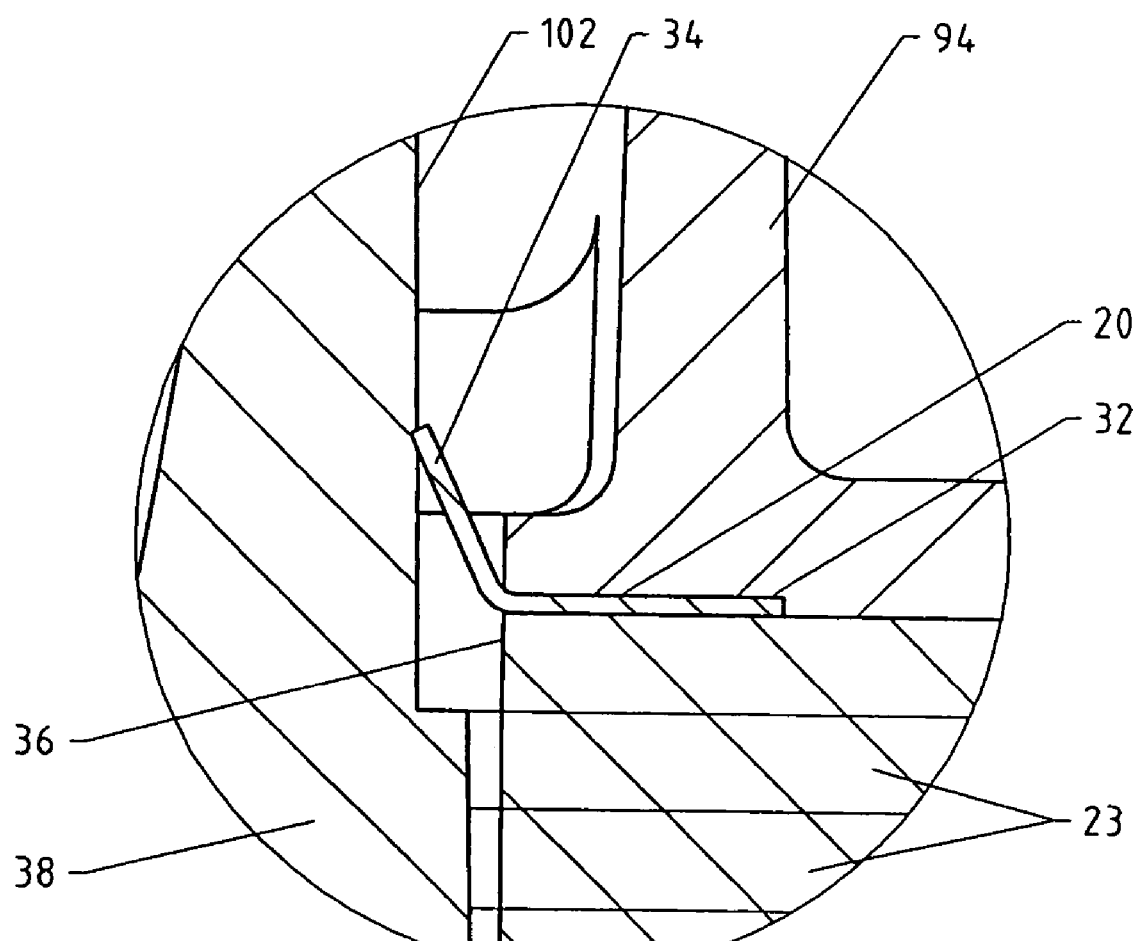
FIG. 7 is an enlarged view of detail VII of FIG. 6.

As FIG. 2 shows, securing ring or disk 20 is preferably placed on the upper end of lamination stack 23 so that its inner diameter or periphery 48 is substantially aligned with the inner diameter 36 of lamination stack 23 and the tabs 34 extend into the inner recess 36, as best seen in FIGS. 3, 5 & 7. In one exemplary motor, the outer diameter of the lamination stack 23 was about 22 mm and the diameter of recess 36 was about 10 mm.

Between stator poles 24–30 are located stator slots 50, 52, 54, 56, in which a winding with two phases 58, 60 is wound, whose winding direction and circuit configuration are clearly apparent from FIG. 3 for this exemplary embodiment. The winding ends are connected with three terminals 62, 64, 66 in such a manner that one end of both phases 58, 60 is connected to terminal 64, the other end of phase 60 is connected to terminal 62, and the other end of phase 58 is connected to terminal 66.

In the region of slots 50 to 56, the outer diameter 70 of securing ring 20 preferably matches the adjacent outer diameter 72 (FIG. 1) of lamination stack 23, while in the region of poles 24–30, the radial projections 32 are located, and therefore extend into these poles, improving the cross section of the magnetic circuit in stator 22 and thereby improving the efficiency of the motor.

Lamination stack 23 is surrounded by an insulating coating or covering 76, which also insulates slots 50–56 and thereby serves as a coil former for the winding phases 58, 60. This coating 76 also secures the terminals 62, 64, 66 in an insulated manner with respect to inner stator 22, and it secures securing ring 20 onto the upper end of lamination stack 23; cf. FIG. 2.

Further, coating 76 forms, at the upper end (referring to FIG. 2) of stator 22, a tube-shaped extension 80 with a lower rim 82 whose inner diameter 84 is substantially the same diameter as that of recess 36 of lamination stack 23.

Toward its top, referring to FIG. 2, coating 76 tapers down in its segments 86, 88, 90, 92 (FIG. 3) which, seen in the circumferential direction, are located in respective gaps between tabs 34 of securing ring 20. Further, there extends upward a collar 94, which is a part of the coil former for the phases 58, 60. Phases 58, 60 preferably are so-called bifilary or double-wound windings, i.e. wires 58 and 60 are wound parallel.

As shown in FIG. 4, bearing support tube 38 has a frusto-conical circumferential surface 98 which extends downwardly to a shoulder 100. In the upper portion of this circumferential surface 98, there are formed, at respective intervals of about 90 degrees, four longitudinal slots 102 whose spacing from a central axis 101 increases from the top toward the bottom. These longitudinal slots serve (as shown in FIG. 7) for longitudinal guidance of the inward tabs 34 of securing ring 20 and for radial securing, since their width substantially corresponds to the widths of tabs 34 (FIG. 1 and FIG. 3), so that the circumferential or angular orientation of stator 22, relative to bearing support tube 38, is precisely defined. This is important because the rotor position sensor (not shown) of the motor is secured to bearing support tube 38 and must have a predetermined angular orientation relative to stator 22.

As shown in FIG. 4, stator 22 is placed, in this correct angular position, onto bearing support tube 38 and is pressed downward with a pressure P. The tubular part 80 is pressed so far onto the outer circumference 98 of bearing support tube 38 that the lower end 82 of part 80 engages against shoulder 100.

In this manner, as indicated in FIGS. 4 and 5, the inward tabs 34 of securing ring 20 impact against the upper end 104 (cf. FIGS. 5 & 6) of bearing support tube 38 and thereby are bent upward, as shown in FIGS. 6 & 7, to form barbs 34'. FIG. 7 shows such a tab in its bent state 34' in which it is so locked into the associated longitudinal slot 102, that disassembly is, for practical purposes, no longer possible. Any force tending to pull bearing support tube 38 back out of recess 36 of stator 22 would only dig barbs 34' deeper into outer surface 98 of tube 38.

Simultaneously, segments 86, 88, 90 and 92 engage elastically against the outer circumferential surface 98 of bearing support tube 38 and provide additional centering and securing, in order to avoid any possible unsymmetrical assembly of stator 22 onto bearing support tube 38.

One thereby achieves a simple and absolutely secure assembly, of stator 22 on the bearing support tube 38, that is very well adapted for automated production, even when the motor has very small dimensions.

Naturally, within the scope of the inventive concept, many variations and modifications are possible. In particular, employing the teaching of the invention can also be very advantageous in the case of larger external rotor motors.

What is claimed is:

1. An external rotor motor, comprising:
   an inner stator (22) including a lamination stack (23) having a coating (76) at least partially covering it, said inner stator (22) being formed with an internal recess (36);
   an external rotor (42);
   a bearing support tube (38) having an inner side equipped with a bearing arrangement for journaling said external rotor, and having an outer side (98) to which said inner stator (22) is secured;
   an annular securing disk (20) made of a ferromagnetic material and secured in said coating (76) of said lamination stack (23), said disk being formed with projecting portions (34) extending radially inward, with respect to a central axis (101) of said bearing support tube (38) into said internal recess (36) of the inner stator (22), said projecting portions (34) having bent portions (34') which engage as barbs into said outer side (98) of said bearing support tube (38), and thereby prevent axial separation of said stator (22) from said bearing support tube (38);
   and wherein said beating support tube (38) has, on its exterior surface, a plurality of axially extending longitudinal guide grooves (102) into which said projecting portions (34) of said annular securing disk (20) engage, thereby defining and maintaining a predetermined angular orientation between said bearing support tube (38) and said stator (22).

2. The external rotor motor of claim 1, wherein said bearing support tube (36) has a first end, dimensioned narrower than a diameter of said stator internal recess (36) and a second end, dimensioned wider than said stator internal recess (36), and wherein said bent portions (34') of said securing disk are angled diagonally toward said first end of said tube (36), thereby preventing axial movement of said tube (38) out of said stator internal recess (36).

3. The external rotor motor of claim 1, wherein said annular securing disk (20) is arranged adjacent to said lamination stack (23) of the inner stator (22).

4. The external rotor motor of claim 1, wherein
   an outer surface (98) of said bearing support tube (38) is formed with a stop (100) and, upon mounting of said inner stator (22) onto said tube (22), said stator abuts against said stop (100).

5. The external rotor motor of claim 1, wherein at least one of said extending portions (34) has a width which corresponds to a width of an associated one of said guide grooves (102).

6. The external rotor motor of claim 1, further comprising fan blades (43) formed on an outer periphery of said external rotor (42).

7. The external rotor motor of claim 1, wherein said external rotor (42) has a diameter not exceeding 60 mm.

8. A fan having, as its drive motor, an external rotor motor comprising:
   an inner stator (22) including a lamination stack (23) having a coating (76) at least partially covering it, said inner stator (22) being formed with an internal recess (36);
   an external rotor (42);
   a bearing support tube (38) having an inner side equipped with a bearing arrangement for rotatably supporting said external rotor (42), and having an outer side (98)

to which said inner stator is secured, said outer side (98) bearing a plurality of axially extending grooves (102);

an annular securing disk (20) secured in said coating (76) of said lamination stack (23), said disk being formed with projecting portions (34) extending radially inward, with respect to a central axis (101) of said bearing support tube (38) into said internal recess (35) of the inner stator (22), said portions (34) simultaneously defining an angular orientation of said stator with respect to said tube and serving as barbs (34') extending, in a mounted orientation, both radially inward and away from said bearing arrangement, and engaging into said outer side (98) of said bearing support tube (38) to prevent axial separation of said stator from said tube.

\* \* \* \* \*

UNITED STATES PATENT AND TRADEMARK OFFICE
CERTIFICATE OF CORRECTION

| | |
|---|---|
| PATENT NO. | : 7,091,639 B2 |
| APPLICATION NO. | : 10/733602 |
| DATED | : August 15, 2006 |
| INVENTOR(S) | : Francisco Rojo Lulic |

It is certified that error appears in the above-identified patent and that said Letters Patent is hereby corrected as shown below:

1. In column 2, line 1 "–" should be deleted

2. In column 2, line 2 "–" should be deleted

3. In column 4, line 22, claim 1, line 19 "tbereby" should be --thereby--

4. In column 4, line 33, claim 2, line 2 "36" should be --38--

5. In column 4, line 38, claim 2, line 7 "36" should be --38--

6. In column 5, line 8, claim 8, line 18 "35" should be --36--

Signed and Sealed this

Eleventh Day of September, 2007

JON W. DUDAS
*Director of the United States Patent and Trademark Office*